Patented Mar. 3, 1925.

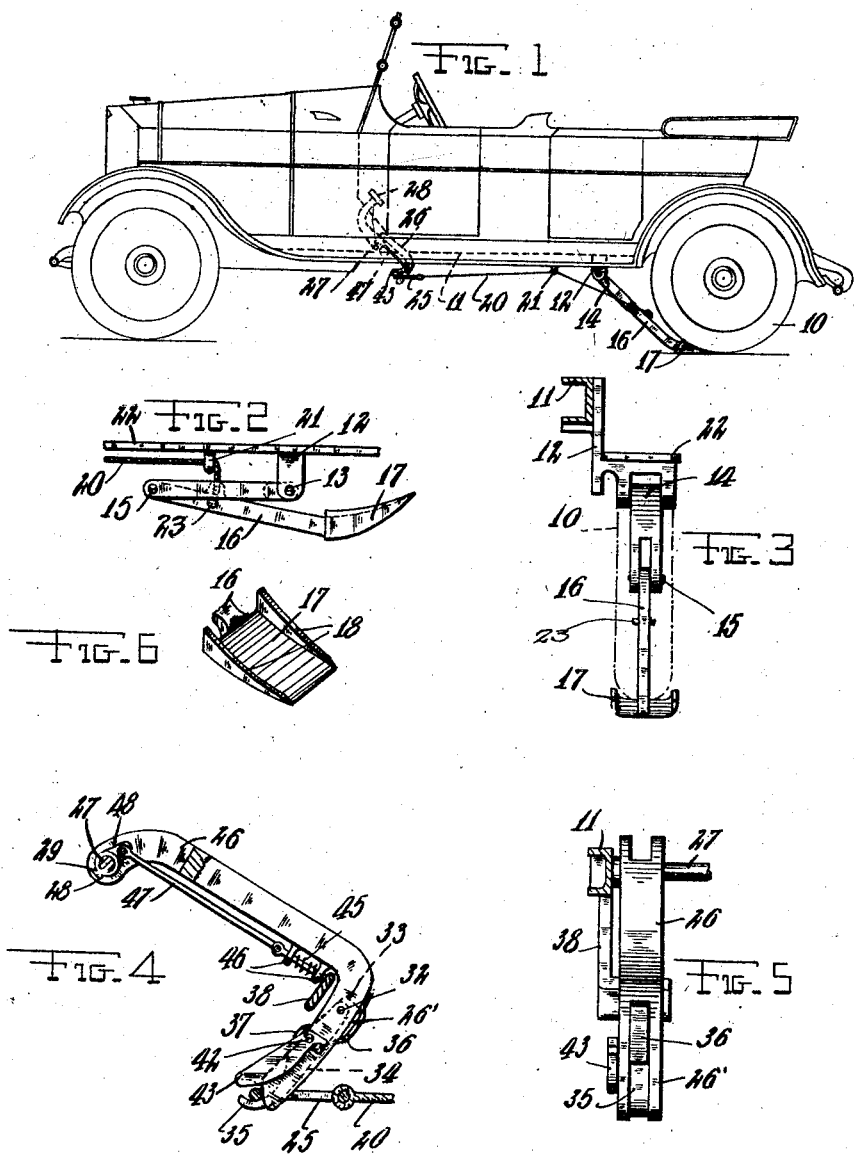

UNITED STATES PATENT OFFICE.

JAMES NAGY, OF SHINNSTON, WEST VIRGINIA.

EMERGENCY-BRAKE DEVICE FOR VEHICLES.

Application filed May 14, 1923. Serial No. 638,687.

*To all whom it may concern:*

Be it known that I, JAMES NAGY, a citizen of Hungary, residing at Shinnston, in the county of Harrison and State of West Virginia, have invented certain new and useful Improvements in Emergency-Brake Devices for Vehicles, of which the following is a specification.

This invention relates to an emergency brake device for automobiles, motor trucks, or like vehicles, adapted to be applied in supplement to the usual brakes for use when an extremely rapid stop is required to prevent accident.

The invention has for an object the provision of a novel and simple emergency brake device of the type, which includes a skid which is normally held raised, but is dropped in front of the wheel of the vehicle to be engaged by the said wheel to stop the vehicle, the invention having particular reference to a novel form of release mechanism.

For further comprehension of the invention, and of the objects and advantages thereof, reference will be had to the following description and accompanying drawings, and to the appended claims in which the various novel features of the invention are more particularly set forth.

Fig. 1 of the drawings is a side view showing my improved device applied to an automobile and in operative position.

Fig. 2 is a side view of the skid and its support, showing the skid as raised to inoperative position.

Fig. 3 is an end view of the skid and its support.

Fig. 4 is an enlarged side view with parts in section of the releasable device engaging the rope which holds the skid raised under normal conditions.

Fig. 5 is an end view of the said device.

Fig. 6 is a detail perspective view of the skid.

In the drawing the reference numeral 10 indicates one of the rear wheels of an automobile and 11 one of the usual main side frame members of the chassis. According to my invention I fix to the frame member 11 a bracket 12 which depends therefrom and has pivoted to its lower end as at 13 one end of a bifurcated arm 14 whose opposite end has pivoted thereto as at 15 one end of a second arm 16 which has a suitable skid 17 fixed to its other end. This skid 17 may be of wedge shape as seen in longitudinal section and is adapted to engage under the wheel 10, the skid being here shown as formed with side flanges 18.

To the arm 16, midway between the ends of the latter, a rope 20 is connected, this rope being passed through a suitable eye 21 on the under side of the running board 22 of the automobile and extending forward under said running board to connect to a releaseable holding device. The eye 21 as shown is located at a slight distance in front of the pivot point 13 of the arm 14 and in consequence, when the arm 14 is swung upwardly and forwardly to a position extending along the under side of the running board, and the arm 16 is doubled or folded upon the arm 14, the rope 20 will hold the two arms in raised position, a stop pin 23 being provided on the arm 16 against which the other arm rests.

The rope 20 has a ring 25 fixed on its forward end and this ring straddles the free end of a latch arm 26 which is carried by a rock shaft 27 extending transversely of the automobile and suitably supported by the frame members 11. Fixed also to this shaft 27 is a foot pedal 28 by depression of which the shaft is rocked to move the latch arm 26 and free the ring 25 from the latter.

The latch arm 26 has limited free movement on shaft 27 for a purpose to be presently explained, the end of arm 26 freely surrounding shaft 27 and being formed with a short arcuate slot 28 into which a pin 29 on the shaft projects.

The latch arm 26 is of angular form as seen in side view and has its outer portion 26' extended concentric to the shaft 27. Pivoted at one end as at 32 in a recess 33 in the said arm part 26' is a latch 34 which has a hook 35 formed on one end which engages under the ring 25 and prevents displacement of the latter, this latch being held in normal position by a spring 36. The latch 34 is formed with a cam hump 37 between its ends which projects beyond that edge of the arm element 26' which faces toward the shaft 27, and is adapted to be engaged by a fixed member 38, when the arm 26 is rocked, to draw the hook 35 of the latch backward.

In order to ensure of the ring 25 slipping off the end of the arm element 26', which end is beveled as shown to normally extend in a vertical direction, I pivot at one end as at 42 to 25 the arm element 26' a pusher finger 43 which engages over the ring 25 and which extends at an angle to the said arm element 26' so as to be engaged by the stop member 38 and swung against the ring to force the latter off the end of the arm element 26' and so free the rope 20 and allow the skid 17 to fall.

To prevent the normal tension of rope 20 from pulling the arm 26 backward, a spring pressed bolt 45 is slidably mounted in guide lugs 46 formed on the side of the said arm, and is connected by a rod 47 with a short arm 48 fixed on the shaft 27, this bolt engaging in a suitable socket in the fixed part 38 and being withdrawn by the initial movement of the pedal 28.

It is believed that the manner of use and operation of my improved device will be readily understood from the above description.

Normally the parts occupy the position shown in Fig. 1, with the skid 17 held in raised position in front of the wheel 10. When the pedal 28 is depressed, and shaft 27 rocked, the initial movement of shaft 27 causes the bolt 45 to be withdrawn from the fixed member 38 in which it normally remains engaged, the pin 29 moving freely in the slot 28 until bolt 45 is withdrawn. The pin 29 then engages the end of slot 28, and further rocking movement of the shaft 27 causes the arm 26 to rock, the parts 37 and 43 successively engaging under the fixed member 38 and first moving the hook 35 backward and then pushing the ring 25 off the end of the arm element 26', and allowing the skid 17 to drop in front of the wheel 10, the arms 14 and 16 being of a combined length sufficient to permit of the wheel riding up on the skid before these arms are drawn taut.

Having thus described my invention, what I claim as new and desire to protect by Letters Patent of the United States is as follows:

1. An emergency vehicle brake comprising a skid adapted to be projected under the wheel of the vehicle, and a foldable member carrying said skid, said foldable member being in the form of a jointed arm hinged to the vehicle at one end and carrying the skid at its other end, a rope connected to said jointed arm for holding it in folded position, a latch arm pivoted on the vehicle and having a hooked latch thereon adapted to engage the said rope to hold the said member folded, and a stop element adapted to be engaged by swinging movement of the said latch arm to swing the said hook to inoperative position.

2. An emergency vehicle brake comprising a skid adapted to be projected under the wheel of the vehicle, and a foldable member carrying said skid, said foldable member being in the form of a jointed arm hinged to the vehicle at one end and carrying the skid at its other end, a rope connected to said jointed arm for holding it in folded position, a latch arm pivoted on the vehicle and having a hooked latch thereon adapted to engage the said rope to hold the said member folded, and a stop element adapted to be engaged by swinging movement of the said latch arm to swing the said hook to inoperative position, and a cam element hinged to the said latch arm and adapted to engage the end of the rope to disengage it from the latch arm.

3. An emergency vehicle brake comprising a skid adapted to be projected under the wheel of the vehicle, and a foldable member carrying said skid, said foldable member being in the form of a jointed arm hinged to the vehicle at one end and carrying the skid at its other end, a rope connected to said jointed arm for holding it in folded position, a latch arm pivoted on the vehicle and having a hooked latch thereon adapted to engage the said rope to hold the said member folded, and a stop element adapted to be engaged by swinging movement of the said latch arm to swing the said hook to inoperative position, a bolt engaged with said stop element for holding said latch arm against swinging movement, a pedal for swinging said latch arm, and means providing a lost motion connection between said pedal and latch arm to permit of release of said bolt on initial movement of said pedal.

4. An emergency vehicle brake comprising a skid adapted to be projected under the wheel of the vehicle, and a foldable member carrying said skid, said foldable member being in the form of a jointed arm hinged to the vehicle at one end and carrying the skid at its other end, a rope connected to said jointed arm for holding it in folded position, a latch arm pivoted on the vehicle and having a hooked latch thereon adapted to engage the said rope to hold the said member folded, and a stop element adapted to be engaged by swinging movement of the said latch arm to swing the said hook to inoperative position, a bolt engaged with said stop element for holding said latch arm against swinging movement, a pedal for swinging said latch arm, and means providing a lost motion connection between said pedal and latch arm to permit of release of said bolt on initial movement of said pedal, said means comprising a pin on the moving element for said latch arm, and engaging in an arcuate slot in the latter.

In testimony whereof I have affixed my signature.

JAMES his × NAGY.
mark